US012030740B2

(12) United States Patent
Takahashi

(10) Patent No.: US 12,030,740 B2
(45) Date of Patent: Jul. 9, 2024

(54) SHEET CONVEYANCE APPARATUS AND IMAGE FORMING APPARATUS

(71) Applicant: CANON KABUSHIKI KAISHA, Tokyo (JP)

(72) Inventor: Kakeru Takahashi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 384 days.

(21) Appl. No.: 17/324,387

(22) Filed: May 19, 2021

(65) Prior Publication Data

US 2021/0371231 A1 Dec. 2, 2021

(30) Foreign Application Priority Data

May 26, 2020 (JP) ................................ 2020-090980

(51) Int. Cl.

| | |
|---|---|
| ***B65H 5/38*** | (2006.01) |
| ***B65H 5/06*** | (2006.01) |
| ***B65H 5/36*** | (2006.01) |
| ***B65H 29/52*** | (2006.01) |
| ***B65H 85/00*** | (2006.01) |
| ***G03G 15/00*** | (2006.01) |
| ***G03G 21/16*** | (2006.01) |

(52) U.S. Cl.

CPC ............ *B65H 85/00* (2013.01); *B65H 5/062* (2013.01); *B65H 5/36* (2013.01); *G03G 15/6529* (2013.01); *G03G 21/1638* (2013.01)

(58) Field of Classification Search

CPC ........... B65H 5/38; B65H 5/36; B65H 29/52; B65H 2601/111; B65H 2601/321; B65H 2402/31; B65H 2402/441; B65H 2404/14212; B65H 2404/15212; G03G 21/1638; G03G 15/6529; G03G 2215/00544

See application file for complete search history.

(56) References Cited

U.S. PATENT DOCUMENTS 7,819,394 B2 10/2010 Shiohara et al.
2016/0185543 A1* 6/2016 Osada ...................... B65H 5/26 271/225
2020/0031598 A1* 1/2020 Mizuta ................... B65H 85/00
2020/0209797 A1* 7/2020 Ikegami ............ G03G 15/6552

FOREIGN PATENT DOCUMENTS

JP 2009-179447 A 8/2009

* cited by examiner

*Primary Examiner* — Luis A Gonzalez
(74) *Attorney, Agent, or Firm* — VENABLE LLP

(57) ABSTRACT

A sheet conveyance apparatus includes a sheet conveyance roller pair to convey a sheet, a first opening and closing guide that opens to a first opened position in which a first conveyance path through which a sheet is conveyed is opened and closes to a first closed position in which a sheet is conveyed in the first conveyance path, and a second opening and closing guide that opens to a second opened position in which a second conveyance path is opened and closes to a second closed position in which a sheet is conveyed in the second conveyance path. A first member is provided on the first opening and closing guide, and a second member is provided on the second opening and closing guide and pivots between a first position and a second position with respect to the second opening and closing guide.

11 Claims, 7 Drawing Sheets

SHEET CONVEYANCE APPARATUS AND IMAGE FORMING APPARATUS

BACKGROUND OF THE INVENTION

Field of the Invention

The present invention relates to a sheet conveyance apparatus for conveying sheets, and an image forming apparatus equipped with the same.

Description of the Related Art

Some image forming apparatuses such as printers and copying machines adopt a configuration where a conveyance path is openable to remove a sheet when sheet jamming occurs. For example, Japanese Patent Application Laid-Open Publication No. 2009-179447 discloses a sheet conveyance apparatus that adopts a configuration where two guide members forming a conveyance path are pivoted in an interlocked manner when opening the conveyance path. According to Japanese Patent Application Laid-Open Publication No. 2009-179447, a first conveyance path formed of an inner guiding member and a first sheet guiding member and a second conveyance path formed of the first sheet guiding member and a second sheet guiding member are opened by pivoting the first sheet guiding member along with the pivoting of the second sheet guiding member. Specifically, in a state where a door of the apparatus is closed, an engagement member arranged on the first sheet guiding member is engaged with a projection provided on the second sheet guiding member. Then, the first sheet guiding member pivots along with the pivoting of the second sheet guiding member toward a door opening direction from a door closed state, by which the engagement of the engagement member and the projection is released and the first and second guiding paths are opened.

According to the configuration of Japanese Patent Application Laid-Open Publication No. 2009-179447, the first sheet guiding member can be pivoted along with the pivoting of the second sheet guiding member since a projection is provided at a position interfering with a movement locus of the engagement member. However, if the second sheet guiding member pivots toward a direction for closing the door with only the second conveyance path opened, the projection interferes with the engagement member, and the door may not be closed. In such a case, in order to close the door, both the first and second conveyance paths must first be opened before the second sheet guiding member is operated in the direction closing the door, so that this configuration had a drawback in that operability is deteriorated.

SUMMARY OF THE INVENTION

The present invention provides a configuration that solves the problems mentioned above and realizes improved operability when opening the door by interlocking a plurality of members.

According to one aspect of the present invention, a sheet conveyance apparatus includes a sheet conveyance portion configured to convey a sheet, a first opening and closing member provided pivotably about a first shaft and configured to open to a first opened position in which a first conveyance path through which a sheet is conveyed by the sheet conveyance portion is opened and configured to close to a first closed position in which a sheet is conveyed in the first conveyance path, a second opening and closing member provided pivotably about a second shaft that differs from the first shaft and configured to open to a second opened position in which a second conveyance path provided downstream of the first sheet conveyance path in a sheet conveyance direction is opened and configured to close to a second closed position in which a sheet is conveyed in the second conveyance path, a first member provided on the first opening and closing member, and a second member provided on the second opening and closing member, the second member being arranged at a position interfering with a movement locus of the first member in a state where the first opening and closing member is pivoted when the second opening and closing member is in the second closed position. While the first opening and closing member is moved from the first closed position to the first opened position in a state where the first opening and closing member is at the first closed position and the second opening and closing member is at the second closed position, a force transmitted to the second opening closing member by the first member interfering with the second member pivots the second opening and closing member from the second closed position toward the second opened position. While the first opening and closing member is moved from the first opened position to the first closed position in a state where the second opening and closing member is at the second closed position and the first opening and closing member is at the first opened position, the second member retracts from the movement locus of the first member by interference of the first member with the second member, and the first opening and closing member is configured to move to the first closed position in a state where the second opening and closing member is positioned at the second closed position.

Further features of the present invention will become apparent from the following description of exemplary embodiments with reference to the attached drawings.

DESCRIPTION OF THE EMBODIMENTS

Exemplary embodiments for carrying out the present invention will be described below with reference to the drawings.

First Embodiment

General Configuration of Image Forming Apparatus

Figure 1:
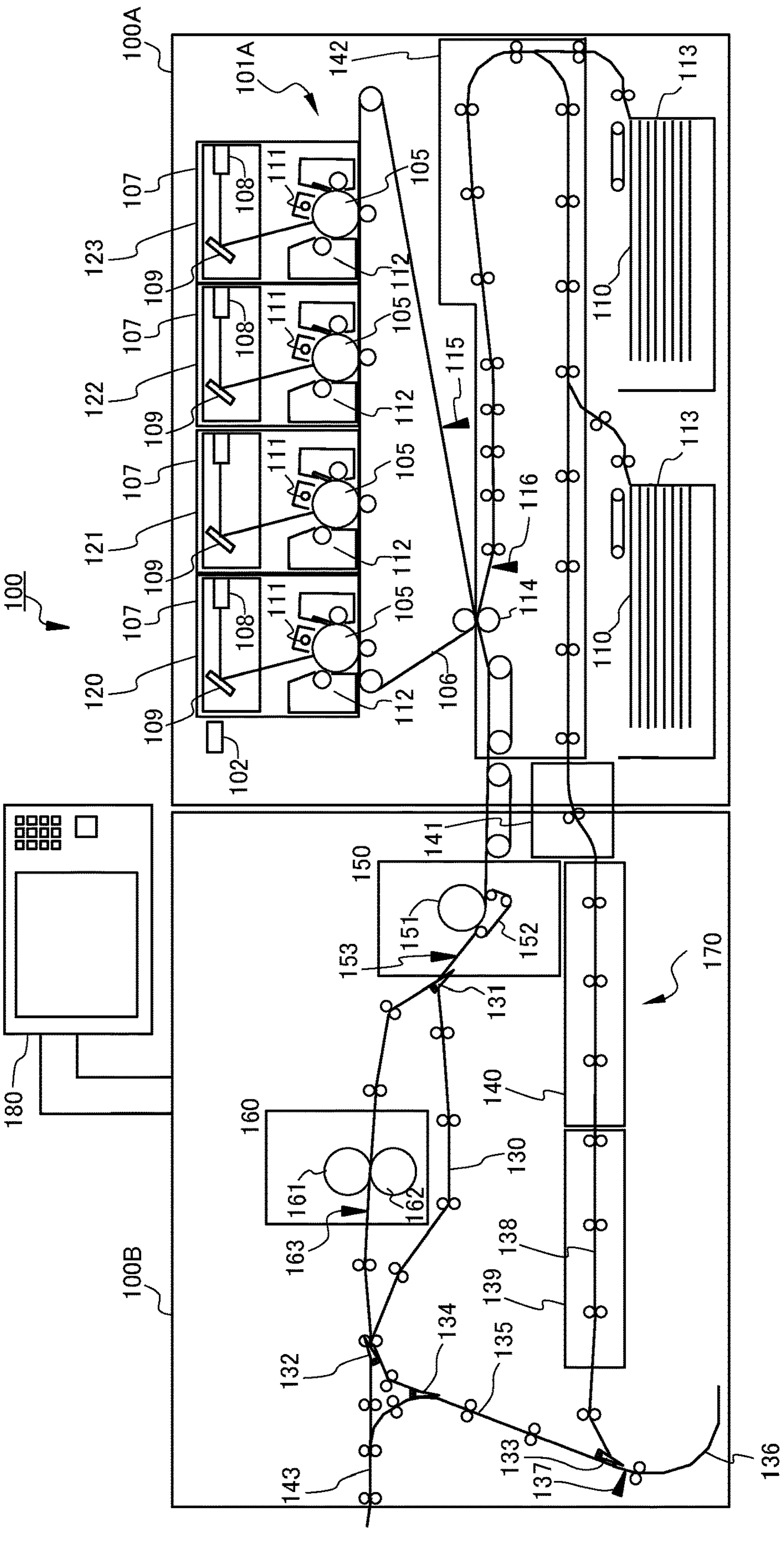
FIG. 1 illustrates a schematic configuration of a printer according to a first embodiment.

At first, a configuration of a sheet conveyance apparatus and a printer 100 serving as an image forming apparatus according to a first embodiment will be described with reference to FIG. 1. FIG. 1 illustrates a schematic configuration of the printer 100. The printer 100 includes casings 100A and 100B. Further, the printer 100 includes an engine unit 101A serving as an image forming unit for carrying out an image forming process, a first fixing unit 150 and a second fixing unit 160 for fixing a toner image on a sheet S, a sheet feed unit 113 for feeding the sheet S, and a conveyance unit 170 for conveying the sheet S. Further, the printer 100 includes a control unit 102 for controlling the engine unit 101A, the first fixing unit 150, the second fixing unit 160, the sheet feed unit 113 and the conveyance unit 170, and a manual operation portion 180 that can be manipulated by the user to execute image forming processes or enter various settings.

The engine unit 101A of FIG. 1 includes a Y (yellow) station 120, an M (magenta) station 121, a C (cyan) station 122, and a K (black) station 123, and capable of outputting a full color image. The Y station 120, the M station 121, the C station 122, and the K station 123 adopt a common structure except for the different toner colors. Each of the Y station 120, the M station 121, the C station 122 and the K station 123 includes a laser scanner unit 107, a photosensitive drum 105, a primary charging unit 111 and a developing unit 112. Laser light is irradiated from the laser scanner unit 107 to the photosensitive drum 105 according to image data provided from the control unit 102 in the Y station 120, the M station 121, the C station 122 and the K station 123. The laser scanner unit 107 reflects the laser light emitted from a semiconductor laser etc. on a rotating polygon mirror or a reflecting mirror and directs the light toward the photosensitive drum 105. The surface of the photosensitive drum 105 is charged uniformly in advance by the primary charging unit 111. The surface of the photosensitive drum 105 is exposed by the laser light irradiated from the laser scanner unit 107, and an electrostatic latent image corresponding to the image data is formed. The electrostatic latent image formed on the surface of the photosensitive drum 105 is formed into a toner image at the developing unit 112. Then, the toner image on the surface of the photosensitive drum 105 is transferred, i.e., primarily transferred, to an intermediate transfer body 106. As described, toner images of respective colors of YMCK are sequentially transferred to the intermediate transfer body 106 and a full-color visible image is formed on the intermediate transfer body 106.

The sheet S fed from the sheet feed unit 113 is conveyed via a conveyance unit 142 of the conveyance unit 170 toward a transfer roller 114. The visible image formed on the intermediate transfer body 106 is transferred, i.e., secondarily transferred, to the sheet S by the transfer roller 114. The photosensitive drum 105 and the developing unit 112 are detachably attached. Further, a position detection sensor 115 for determining a print start position when carrying out an image forming process and a timing sensor 116 for measuring a timing for feeding the sheet S are arranged at a circumference of the intermediate transfer body 106. The sheet to which toner image has been transferred by the transfer roller 114 is conveyed toward the first fixing unit 150. The first fixing unit 150 includes a fixing roller 151 for applying heat to the sheet S, a pressurization belt 152 for causing the sheet S to be in pressure contact with the fixing roller 151, and a post-fixing sensor 153 for detecting completion of the fixing process, wherein the toner image transferred to the sheet S is fixed by applying heat and pressure thereto. The fixing roller 151 includes a heater arranged therein, and the fixing roller 151 is driven to rotate while simultaneously nipping and conveying the sheet S together with the pressurization belt 152. The sheet S having passed the first fixing unit 150 is conveyed toward the second fixing unit 160.

The second fixing unit 160 is arranged downstream of the first fixing unit 150 in a conveyance direction of the sheet S, where glossiness can be applied to the sheet S to which toner image has been fixed in the first fixing unit 150, or fixing property thereof can be improved. Similar to the first fixing unit 150, the second fixing unit 160 also includes a fixing roller 161, a pressure roller 162 and a post-fixing sensor 163, and is configured to apply heat and pressure to the sheet S. Some types of sheets do not require pressing and heating at the second fixing unit 160. In such a case, the sheet S is conveyed toward a conveyance path 130 without passing through the second fixing unit 160 so as to suppress energy consumption of the printer 100. The sheet S is guided by a switching flap member 131 to the conveyance path 130. Then, the sheet S having passed through the second fixing unit 160 or the conveyance path 130 is guided by switching flap members 132 and 134 to a sheet discharge conveyance path 143 or a reverse conveyance path 135. The sheet S guided to the reverse conveyance path 135 is subjected to position detection by a reverse sensor 137 and thereafter subjected to switchback at a reverse portion 136. The sheet S subjected to switchback at the reverse portion 136 has its leading edge switched with its trailing edge in the conveyance direction. The reversed sheet S is passed through a duplex conveyance path 138 and the conveyance unit 142 toward the transfer roller 114 again, where toner image is transferred and fixed to a rear side of the sheet S in a similar manner as the front side. The duplex conveyance path 138 serving as an example of the conveyance path through which the sheet is conveyed is formed by conveyance units 139, 140 and 141. The conveyance units 139, 140 and 141 are provided with a plurality of roller pairs that nip and convey the sheet. The conveyance unit 170 serving as a sheet conveyance portion according to the present embodiment is composed of roller pairs provided in the conveyance path 130 and the reverse conveyance path 135 and of the conveyance units 139, 140, 141 and 142.

Configuration for Processing Sheet Jamming

Figure 2:
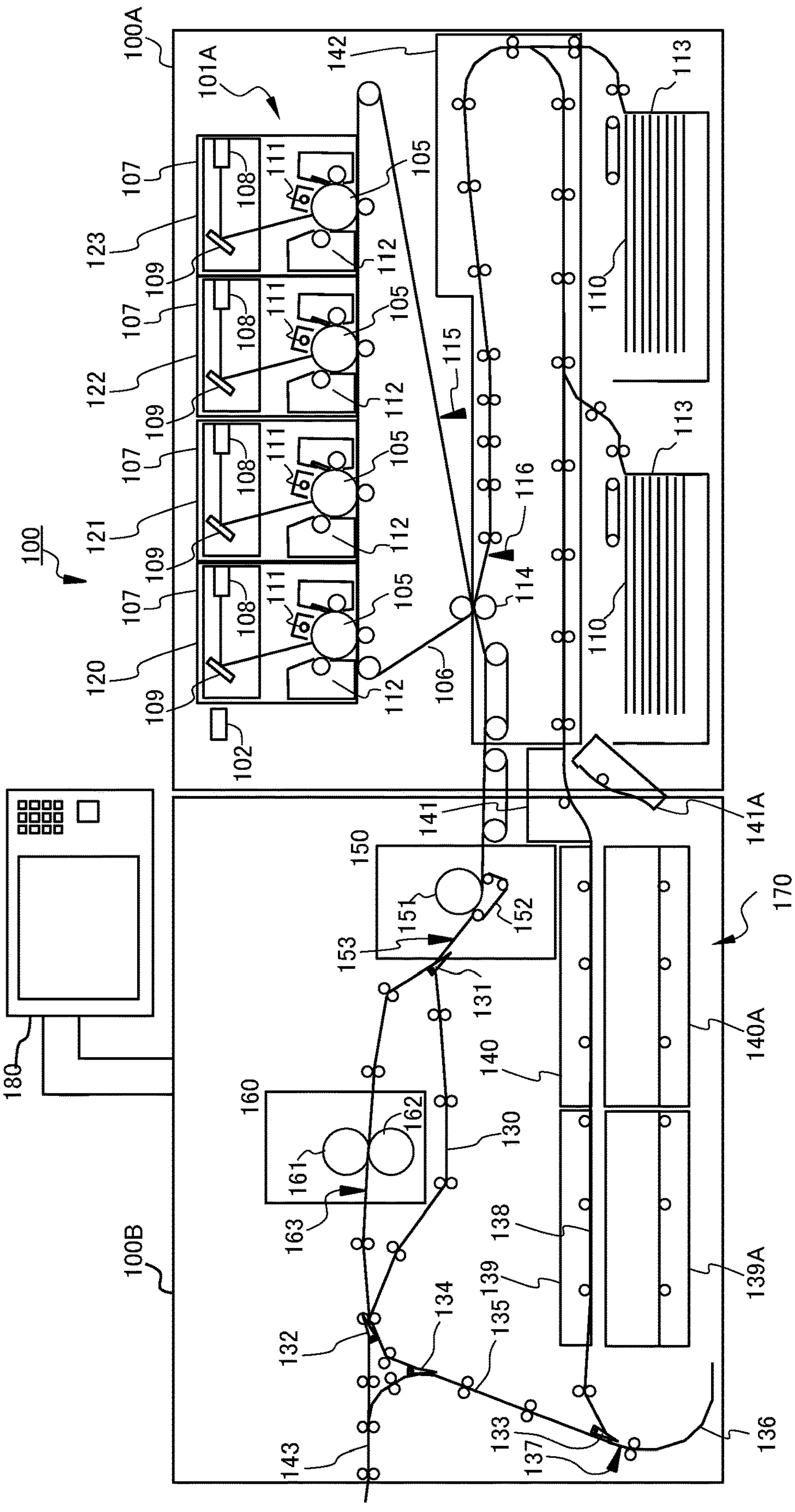
FIG. 2 illustrates a printer according to the first embodiment with a duplex conveyance path opened.

Next, a process for treating sheet jamming that has occurred in the duplex conveyance path 138 according to the present embodiment will be described with reference to FIG. 2. FIG. 2 is a view illustrating the printer 100 with the duplex conveyance path 138 opened. Conveyance units 139 and 140 include lower conveyance guides 139A and 140A that have a pivot fulcrum arranged at a depth side when viewed from a front side of the casings 100A and 100B, and the conveyance units 139 and 140 are designed to have the front sides thereof opened using a grip not shown. The conveyance unit 141 includes a lower conveyance guide 141A having a pivot fulcrum arranged at a right side, that is, downstream side in the conveyance direction, when viewed from the front side of the casings 100A and 100B, and a left side, that is, upstream side in the conveyance direction, of the conveyance unit 141 is configured to be opened using a grip not shown. The conveyance unit 142 is supported in an insertable and removable manner by a rail not shown to the casing 100A, and the conveyance unit 142 can be inserted from and removed to the front side when viewed from the front side of the casing 100A. The printer 100 can convey a sheet that is so-called a long sheet having a significantly long length in the conveyance direction. Therefore, the conveyance units 139, 140 and 141 can be opened to expose the duplex conveyance path 138, so that the removal of a jammed sheet can be performed easily even if a long sheet is jammed.

Opening and Closing of Lower Conveyance Guides 140A and 141A

Figure 3:
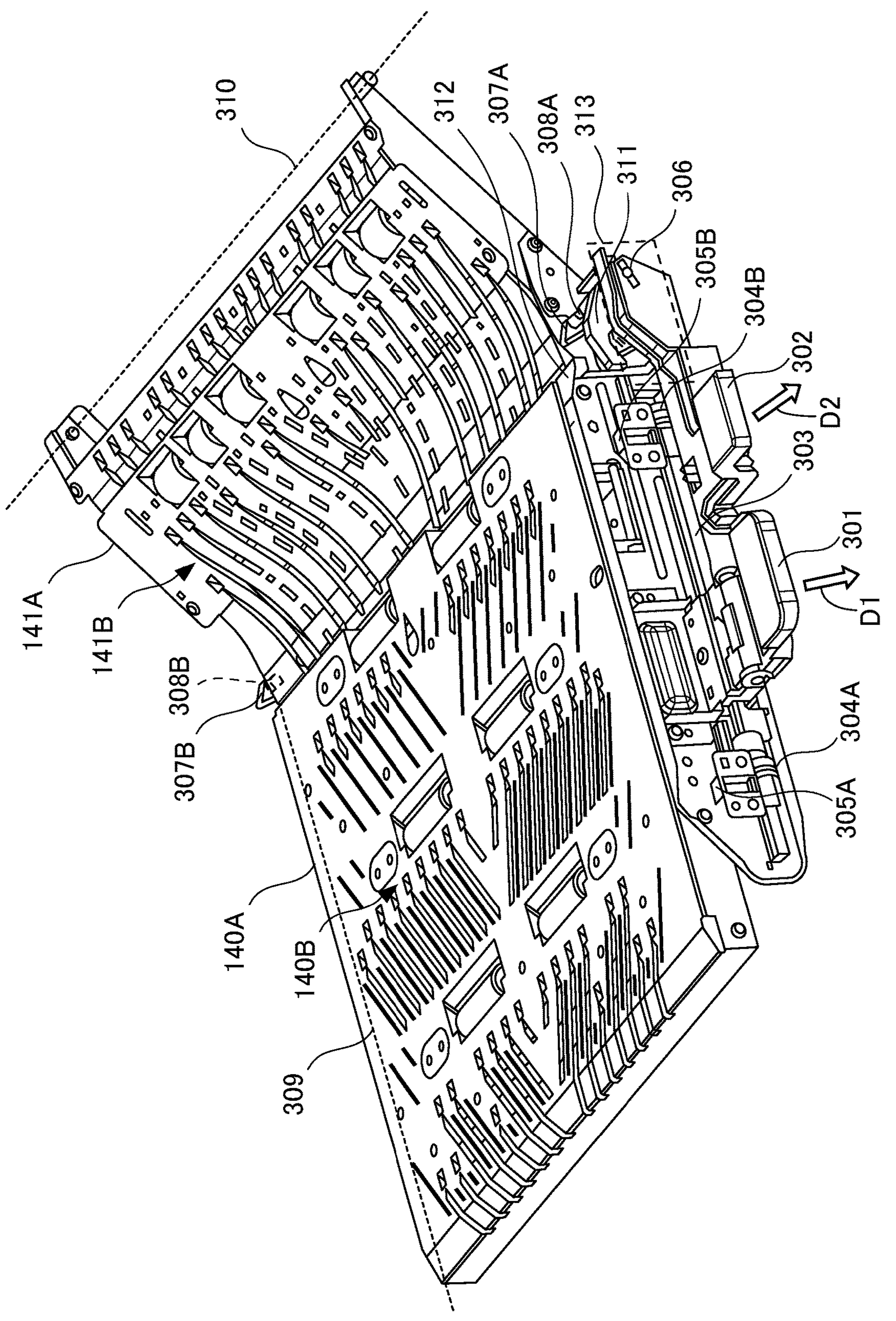
FIG. 3 is a perspective view of a lower conveyance guide according to the first embodiment with the conveyance path not opened.
Figure 4:
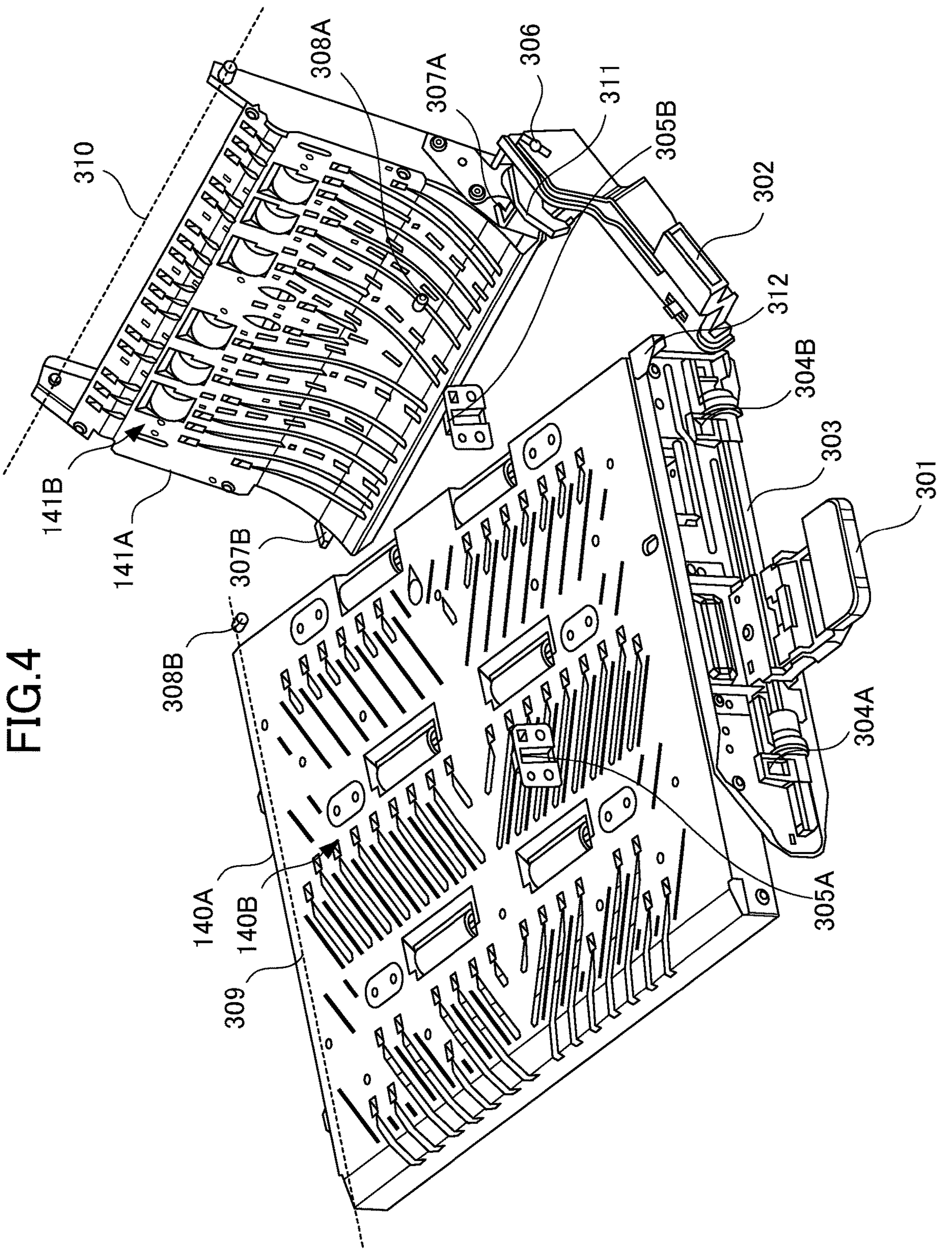
FIG. 4 is a perspective view of a lower conveyance guide according to the first embodiment with the conveyance path opened.

Next, a configuration for opening and closing the lower conveyance guides 140A and 141A will be described. FIG. 3 is a perspective view of the lower conveyance guides 140A and 141A in a state where the duplex conveyance path 138 is not opened. FIG. 4 is a perspective view of the lower conveyance guides 140A and 141A in a state where the duplex conveyance path 138 is opened. The lower conveyance guide 140A includes a conveyance surface 140B serving as a first conveyance guide surface that forms the duplex conveyance path 138. Further, the lower conveyance guide 140A includes a grip 301 that serves as a first door operation member according to the present embodiment, and when the grip 301 is pressed toward an arrow D1 direction of FIG. 3, hooks 304A and 304B that are integrally supported on a shaft 303 are rotated. The lower conveyance guide 140A is unlocked when the hooks 304A and 304B are rotated and disengaged from catchers 305A and 305B that are supported on the casing 100B (refer to FIGS. 1 and 2). As a result, the lower conveyance guide 140A can be pivoted about a pivot shaft 309 serving as a first shaft (refer to FIG. 4). A first door lock mechanism according to the present embodiment is composed of the shaft 303, the hooks 304A and 304B and the catchers 305A and 305B. The position of the hooks 304A and 304B and the catchers 305A and 305B when regulating, i.e., locking, the movement of the lower conveyance guide 140A in a state where the duplex conveyance path 138 is not opened is a first door lock position according to the present embodiment. In the first door lock position, the hook 304A and the catcher 305A are engaged, and the hook 304B and the catcher 305B are also engaged. Meanwhile, the position of the hooks 304A and 304B and the catchers 305A and 305B when the lower conveyance guide 140A is unlocked is a first door unlock position according to the present embodiment. In the first door unlock position, the hook 304A and the catcher 305A are disengaged, and the hook 304B and the catcher 305B are disengaged.

The lower conveyance guide 141A is arranged downstream of the lower conveyance guide 140A in the sheet conveyance direction and includes a conveyance surface 141B serving as a second conveyance guide surface that forms the duplex conveyance path 138 and a grip 302 that serves as a second door operation member according to the present embodiment. The grip 302 is connected to a shaft member 306, and when the grip 302 is pressed toward an arrow D2 direction of FIG. 3, hooks 307A and 307B that are integrally supported on the shaft member 306 are rotated in a counterclockwise direction. The lower conveyance guide 141A is unlocked when the hooks 307A and 307B are rotated in the counterclockwise direction and disengaged from shafts 308A and 308B that are supported on the casing 100A (refer to FIGS. 1 and 2). As a result, the lower conveyance guide 141A can be pivoted about a pivot shaft 310 serving as a second shaft that differs from the first shaft (refer to FIG. 4). The pivot shaft 310 is a shaft that extends in parallel to a direction intersecting the pivot shaft 309, and it is in a twisted positional relationship with the pivot shaft 309. A second door lock mechanism, i.e., second opening and closing member lock mechanism, according to the present embodiment is composed of the shaft member 306, the hooks 307A and 307B and the shafts 308A and 308B. The position of the hooks 307A and 307B and the shafts 308A and 308B in a state where the movement of the lower conveyance guide 141A is regulated, i.e., locked, with the duplex conveyance path 138 not opened is a second door lock position, i.e., second opening and closing member lock position, according to the present embodiment. In the second door lock position, the hook 307A and the shaft 308A are engaged, and the hook 307B and the shaft 308B are also engaged. Meanwhile, the position of the hooks 307A and 307B and the shafts 308A and 308B when the lock of the lower conveyance guide 141A is unlocked is a second door unlock position, i.e., second opening and closing member unlock position, according to the present embodiment. In the second door unlock position, the hook 307A and the shaft 308A are disengaged, and the hook 307B and the shaft 308B are disengaged.

Interlocking Configuration of Lower Conveyance Guides 140A and 141A

Figure 5A:
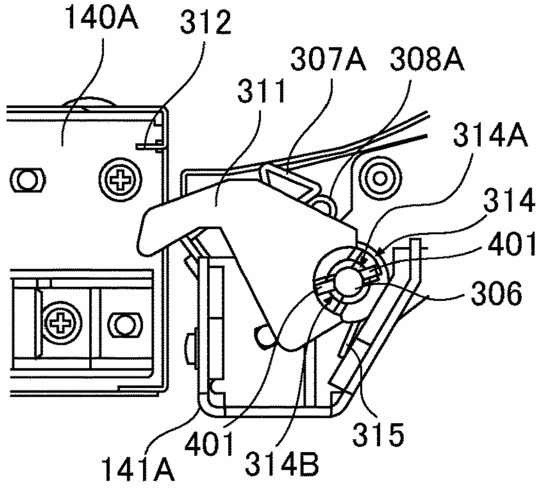
FIG. 5A is an enlarged view of an interlocking mechanism according to the first embodiment.

Next, a configuration for pivoting the lower conveyance guides 140A and 141A in an interlocked manner according to the present embodiment will be described with reference to FIGS. 5 and 6. FIGS. 5 and 6 are enlarged views of a broken line area 313 of FIG. 3. At first, the configuration of the lower conveyance guides 140A and 141A illustrated in the broken line area 313 of FIG. 3 will be described with reference to FIG. 5A. FIG. 5A illustrates an interlocking configuration of the lower conveyance guides 140A and 141A in a state where the duplex conveyance path 138 (refer to FIGS. 1 and 2) is not opened.

A link 311 designed to rotate only in one direction with respect to the shaft member 306 is provided on the lower conveyance guide 141A. Meanwhile, a projected portion 312 that is formed integrally with the lower conveyance guide 140A is provided on the lower conveyance guide 140A. A first member according to the present embodiment is the projected portion 312 and a second member is the link 311. Further according to the present embodiment, the lower conveyance guide 140A having the projected portion 312 serving as the first member is referred to as the first door, and the lower conveyance guide 141A provided with the link 311 serving as the second member is referred to as the second door. It is also possible to adopt a configuration where the projected portion 312 is provided on the lower conveyance guide 141A and the link 311 serving as the second member is provided on the lower conveyance guide 140A. Further, a position of the lower conveyance guide 140A in a state where the duplex conveyance path 138 is not opened (refer to FIGS. 1 and 3) is a first closed position of the present embodiment, and a position of the lower conveyance guide 140A in a state where the duplex conveyance path 138 is opened (refer to FIGS. 2 and 4) is a first opened position according to the first embodiment. Further, a position of the lower conveyance guide 141A in a state where the duplex conveyance path 138 is not opened (refer to FIGS. 1 and 3) is a second closed position according to the present embodiment, and a position of the lower conveyance guide 141A in a state where the duplex conveyance path 138 is opened (refer to FIGS. 2 and 4) is a second opened position according to the present embodiment. In the present embodiment, the lower conveyance guide 140A is configured switchably, i.e., movably, between the first opened position and the first closed position, and the lower conveyance guide 141A is configured switchably, i.e., movably, between the second opened position and the second closed position. In other words, the lower conveyance guide 140A can be referred to as a first opening and closing member that can be opened to a first opened position where a first conveyance path through which sheets are conveyed by the sheet conveyance portion is opened and closed to a first closed position where sheets can be conveyed in the first conveyance path. Further, the lower conveyance guide 141A can be referred to as a second opening and closing member that can be opened to a second opened position where a second conveyance path arranged downstream of the first sheet conveyance path in the sheet conveyance direction is opened and closed to a second closed position where sheets can be conveyed in the second conveyance path.

Figure 5B:
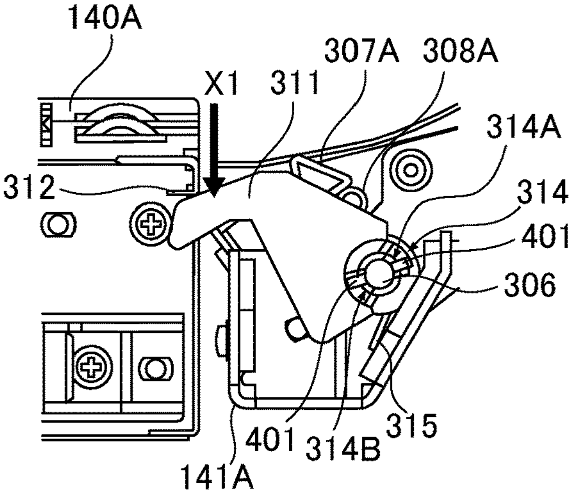
FIG. 5B is an enlarged view of the interlocking mechanism according to the first embodiment.
Figure 5C:
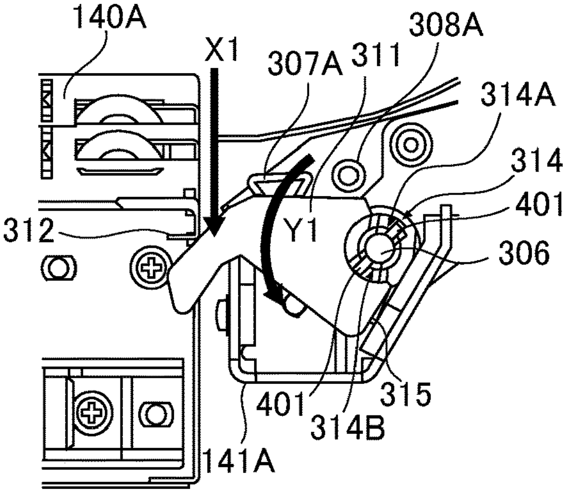
FIG. 5C is an enlarged view of the interlocking mechanism according to the first embodiment.

In the present embodiment, if the lower conveyance guide 140A is pivoted toward the first opened position in a state where the duplex conveyance path 138 is not opened, the lower conveyance guide 141A is pivoted in an interlocked manner along with the pivoting of the lower conveyance guide 140A. The state where the duplex conveyance path 138 is not opened refers to a state where the lower conveyance guide 140A is in the first closed position and the lower conveyance guide 141A is in the second closed position. FIG. 5A illustrates an interlocking configuration of the lower conveyance guides 140A and 141A in a state where the duplex conveyance path 138 is not opened, as described above. FIG. 5B is a view illustrating a state where the lower conveyance guide 140A has been pivoted from the position illustrated in FIG. 5A so that the link 311 is abutted against the projected portion 312. FIG. 5C is a view illustrating a state where the lower conveyance guide 140A has been pivoted further from the position illustrated in FIG. 5B.

As illustrated in FIG. 5A, a hole capable of receiving insertion of a parallel pin 401 is formed on the shaft member 306. The hole can be formed either as a through hole penetrating the shaft member 306 or as a dent having a depth capable of receiving the parallel pin 401. An engagement portion according to the present embodiment is formed by the parallel pin 401 inserted to the hole and projected from an outer circumference of the shaft member 306. Further, the link 311 includes a recessed portion 314 serving as an engaged portion capable of being engaged with the parallel pin 401, and the link 311 is supported on the shaft member 306 by the engagement of the parallel pin 401 with the recessed portion 314. The recessed portion 314 is formed in a fan shape centered about the shaft member 306, and gaps 314A and 314B are formed between the recessed portion 314 and the parallel pin 401 inserted to the shaft member 306 to allow movement of the parallel pin 401. The link 311 is supported pivotably with respect to the shaft member 306 by having the parallel pin 401 move in the gaps 314A and 314B. Further, the link 311 is provided with a torsion spring 315 that serves as an urging member that urges the link 311 toward one side in a pivoting direction about the shaft member 306. In the present embodiment, the urging force of the torsion spring 315 causes the link 311 and the shaft member 306 to be engaged in a state where the parallel pin 401 inserted to the shaft member 306 is abutted against one side surface of the recessed portion 314 with respect to the recessed portion 314. Further according to this configuration, the link 311 is regulated from pivoting in a counterclockwise direction with respect to the shaft member 306 at a position where the parallel pin 401 is abutted against one side surface of the recessed portion 314. The position of the link 311 with respect to the shaft member 306 in a state where the parallel pin 401 is abutted against one side surface of the recessed portion 314 is one example of an engagement position of the present embodiment. That is, in the position illustrated in FIG. 5A, the link 311 is pivotable in the clockwise direction with respect to the shaft member 306 but is regulated from pivoting in the counterclockwise direction (direction Y1 of FIG. 5C). FIG. 5A illustrates the link 311 and the shaft member 306 in a state where the parallel pin 401 inserted to the shaft member 306 is engaged with the recessed portion 314 in a state abutted against one side surface of the recessed portion 314.

When the grip 301 (refer to FIG. 3) is operated from the position illustrated in FIG. 5A to pivot the lower conveyance guide 140A toward direction X1 of FIG. 5B, the projected portion 312 interferes with the link 311. This is because the link 311 is arranged at a position interfering with a movement locus of the projected portion 312 when the lower conveyance guide 140A is pivoted from a state where the duplex conveyance path 138 is not opened. As illustrated in FIG. 5B, force toward direction X1 is transmitted from the projected portion 312 to the link 311 interfering with the projected portion 312. The force toward direction X1 is a force that rotates the link 311 in the counterclockwise direction, but as described above, the link 311 is regulated from pivoting in the counterclockwise direction with respect to the shaft member 306. Thereby, force of movement in direction X1 from the projected portion 312 is transmitted to the lower conveyance guide 141A and acts as a force that rotates the shaft member 306 in direction Y1 of FIG. 5C. Rotation of the shaft member 306 in direction Y1 by the force transmitted to the shaft member 306 by the projected portion 312 interfering with the link 311 causes the hook 307A and the shaft 308A to be disengaged. As a result, the lower conveyance guide 141A can be pivoted to a direction opening the duplex conveyance path 138 along with the pivoting of the lower conveyance guide 140A.

Figure 6A:
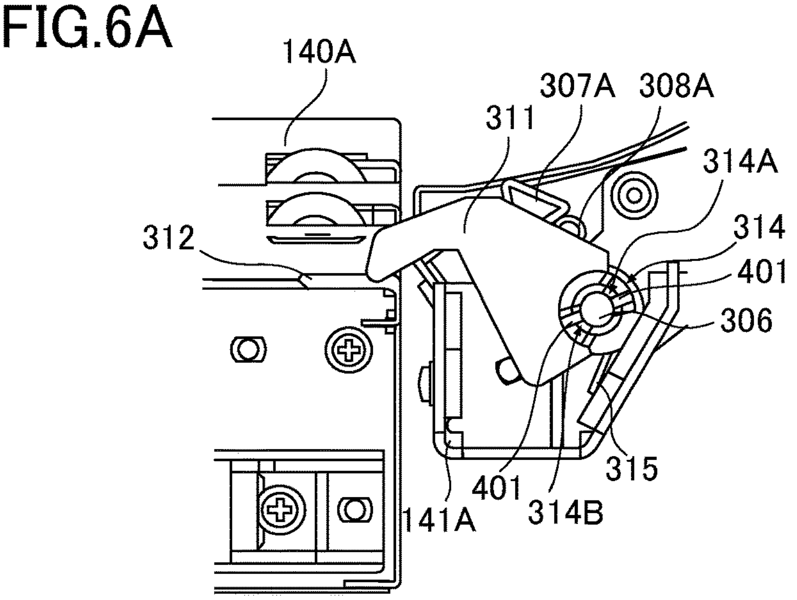
FIG. 6A is an enlarged view of the interlocking mechanism according to the first embodiment.
Figure 6B:
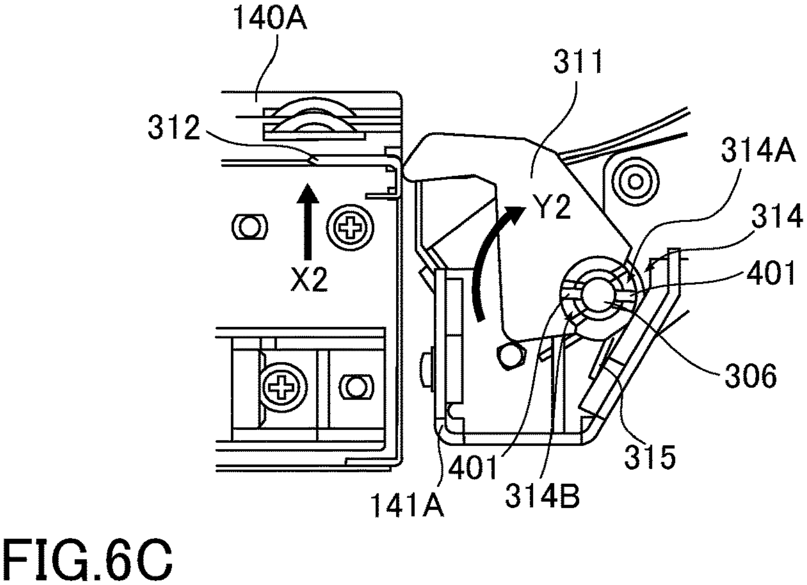
FIG. 6B is an enlarged view of the interlocking mechanism according to the first embodiment.
Figure 6C:
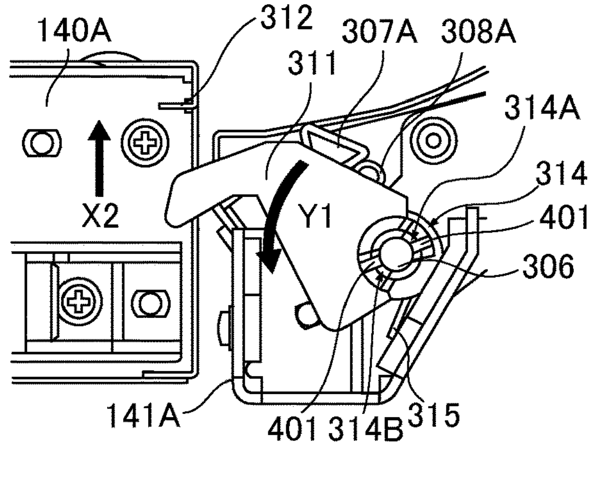
FIG. 6C is an enlarged view of the interlocking mechanism according to the first embodiment.

Next, the configuration of the lower conveyance guides 140A and 141A will be described, where the lower conveyance guide 141A is first moved to the second closed position from a state where the duplex conveyance path 138 is opened and then the lower conveyance guide 140A is moved from the first opened position to the first closed position. FIG. 6A illustrates the configuration of the lower conveyance guides 140A and 141A in a state where the duplex conveyance path 138 is opened only by the lower conveyance guide 141A. FIG. 6B illustrates the configuration of the lower conveyance guides 140A and 141A in a state where the lower conveyance guide 140A has pivoted from the position of FIG. 6A. FIG. 6C is a view illustrating the configuration of the lower conveyance guides 140A and 141A in a state where the lower conveyance guide 140A has pivoted further from the position of FIG. 6B.

From the state of FIG. 6A where the lower conveyance guide 141A is in the second closed position and the lower conveyance guide 140A is in the first opened position, the lower conveyance guide 140A is pivoted toward direction X2 of FIG. 6B to be moved toward the first closed position. Then, the projected portion 312 interferes with the link 311 and force of movement in direction X2 is transmitted from the projected portion 312 to the link 311. The force of movement in direction X2 is the force that causes the link 311 to rotate in the clockwise direction (direction Y2 of FIG.

6B). Then, the link 311 pivots against the urging force of the torsion spring 315 from where the parallel pin 401 abuts against one side surface of the recessed portion 314 until it abuts against another side surface arranged on the other side in direction Y2. Regarding the pivoting direction of the link 311, the position of the link 311 with respect to the shaft member 306 where the parallel pin 401 having passed through the gaps 314A and 314B abuts against the side surface positioned on the other side of the recessed portion 314 is an example of a retracting position of the present embodiment. By the link 311 pivoting in the clockwise direction with respect to the shaft member 306, the link 311 is retracted from the movement locus of the projected portion 312 (FIG. 6B). In other words, since the pivoting of the link 311 toward the direction retracting from the movement locus of the projected portion 312 is permitted by the gaps 314A and 314B provided in the recessed portion 314, the relative positions of the link 311 and the projected portion 312 are switched. As a result, the lower conveyance guide 140A can be moved in direction X2, and finally, the lower conveyance guide 140A can be moved to the first closed position in a state where the lower conveyance guide 141A is positioned at the second closed position. Further, after retracting from the movement locus of the projected portion 312, the link 311 pivots in the counterclockwise direction (direction Y1 of FIG. 6C) by the urging force of the torsion spring 315 until the parallel pin 401 abuts against one side surface of the recessed portion 314. In this state, since the shaft member 306 is not rotated, the hook 307A and the shaft 308A are in an engaged state. As a result, according to the present embodiment, the lower conveyance guides 140A and 141A can be operated to move to a position forming the duplex conveyance path 138 or to a position opening the duplex conveyance path 138 regardless of the order of operation of the lower conveyance guides 140A and 141A.

In a conventional printer, a plurality of different guide members are interlocked to open the conveyance path, but the interlocking mechanism causes a hinderance when operating the guide members to form the conveyance path by operating the guide members. In contract, according to the present embodiment, the relative positions of the projected portion 312 and the link 311 that interlocks the lower conveyance guides 140A and 141A can be replaced. Thereby, regardless of the order of operation of the lower conveyance guides 140A and 141A, the duplex conveyance path 138 can be formed or opened, so that the operability can be improved.

Modified Example

Figure 7A:
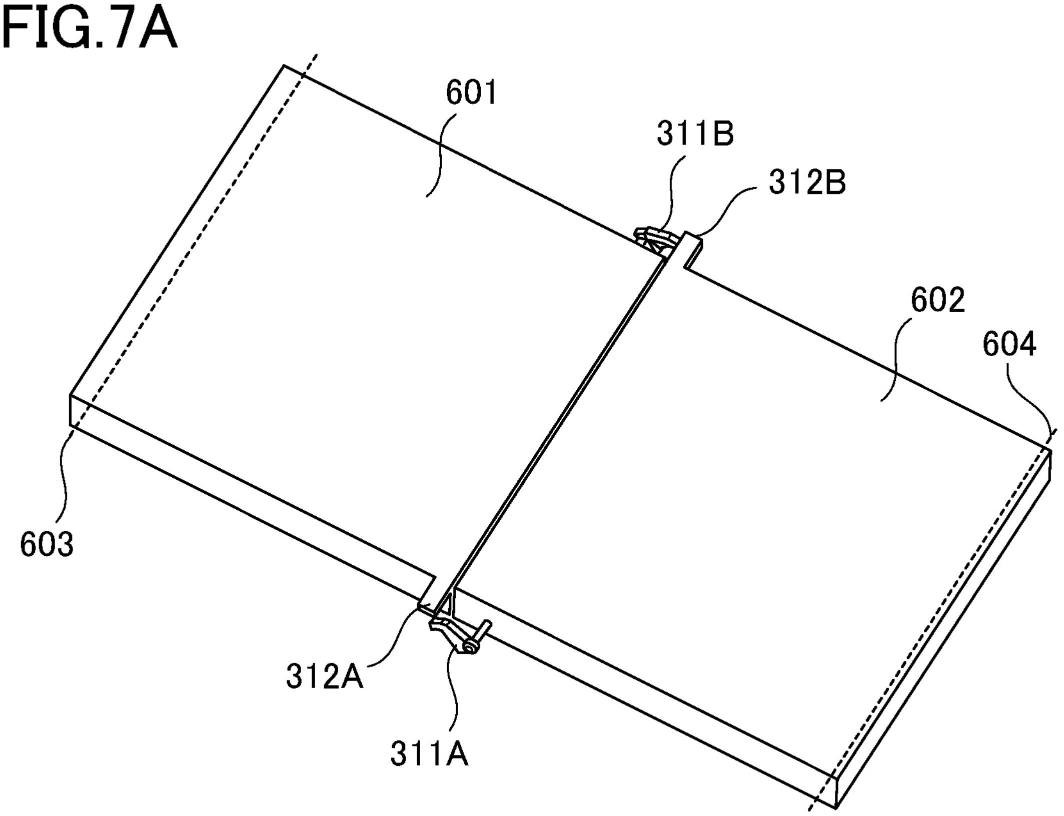
FIG. 7A is a perspective view of a lower conveyance guide according to a modified example of the first embodiment.
Figure 7B:
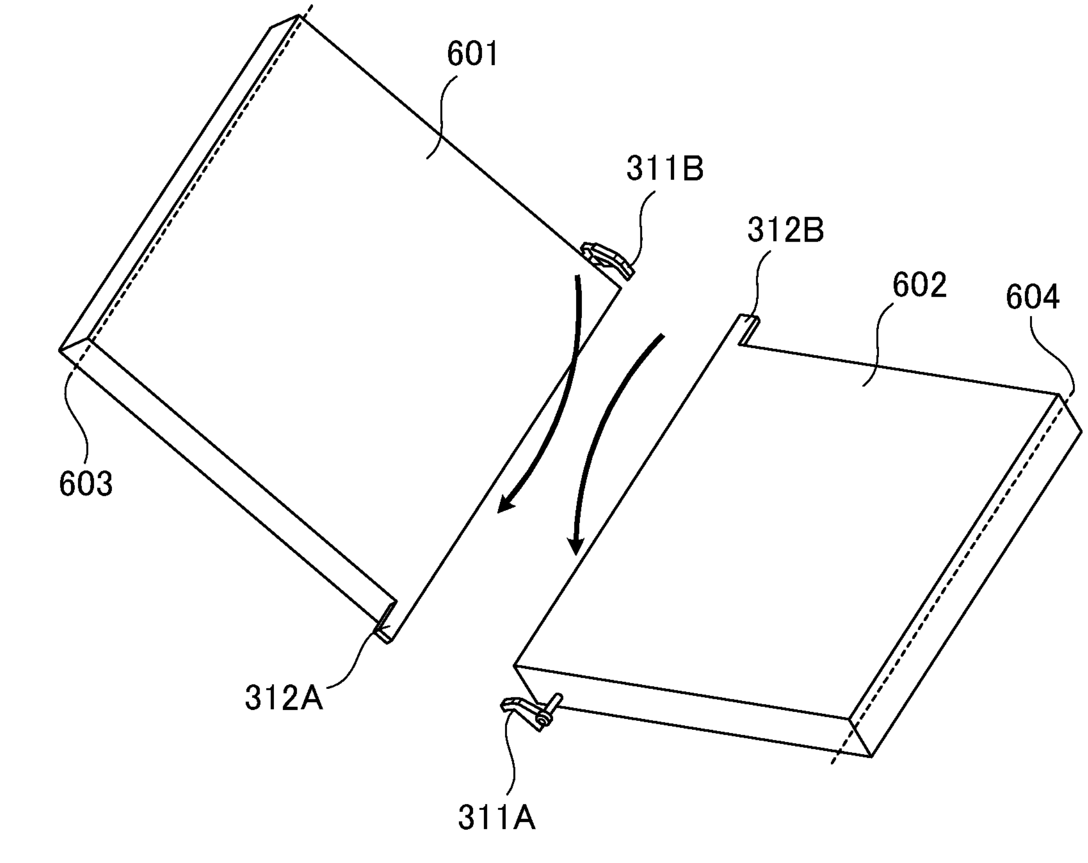
FIG. 7B is a perspective view of the lower conveyance guide according to a modified example of the first embodiment.

The configuration of the first embodiment is applicable, for example, to a configuration where a lower conveyance guide 601 serving as the first door and a lower conveyance guide 602 serving as the second door respectively pivot to open and close about pivot fulcrums 603 and 604 that are parallel to each other, as illustrated in FIGS. 7A and 7B. In that case, a configuration can be adopted where a projection 312A serving as a first member and a link 311B serving as a second member are arranged on the lower conveyance guide 601 and a link 311A serving as a fourth member and a projection 312B serving as a third member are arranged on the lower conveyance guide 602. That is, the positional relationship of the third and fourth members with respect to the first and second doors can be opposite as the positional relationship of the first and second members, but the configuration and function of the third member is similar to the first member, and the configuration and function of the fourth member is similar to the second member. Thereby, by merely opening only either one of the lower conveyance guides 601 and 602, both the lower conveyance guides 601 and 602 can be opened in an interlocked manner. Further, by closing either one of the lower conveyance guides 601 and 602 first in a state where the lower conveyance guides 601 and 602 are opened, both the lower conveyance guides 601 and 602 can be closed without interfering with one another.

Other Embodiments

In the first embodiment, a system where a pivot-type hook is engaged with a shaft or a catcher is adopted as the first and second door lock mechanisms for locking the lower conveyance guides 140A and 141A. Other types of lock mechanisms can also be adopted, such as a magnet that can be opened by applying an urging force greater than a certain force, for example, an attracting force of the magnet.

Further, a configuration of the lower conveyance guides 140A and 141A can include an auto document feeder where multiple sheets are sequentially fed, conveyed and read. In this case, the auto document feeder corresponds to the sheet conveyance apparatus of the present embodiment. Further, the configuration of the present embodiment can be applied to a sheet conveyance apparatus capable of executing conveyance of sheets, such as a finisher adopting a configuration corresponding to the lower conveyance guides 140A and 141A.

Further, the printer 100 can be formed of a single casing including the conveyance unit 140. Moreover, a configuration corresponding to the projected portion 312 or the link 311 can be provided to the plurality of doors formed to open and close on the printer 100 to enable the plurality of doors to be opened and closed with improved operability, similar to the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-090980, filed May 26, 2020, which is hereby incorporated by reference herein in its entirety.

What is claimed is:

1. A sheet conveyance apparatus comprising:

a sheet conveyance roller pair configured to convey a sheet;

a first opening and closing guide provided pivotably about a first shaft and configured to open to a first opened position in which a first conveyance path through which a sheet is conveyed by the sheet conveyance roller pair is opened and configured to close to a first closed position in which a sheet is conveyed in the first conveyance path;

a second opening and closing guide provided pivotably about a second shaft that differs from the first shaft and configured to open to a second opened position in which a second conveyance path is opened and configured to close to a second closed position in which a sheet is conveyed in the second conveyance path;

a first member provided on the first opening and closing guide; and a second member provided on the second opening and closing guide and configured to pivot between a first position and a second position with respect to the second opening and closing guide, wherein the first position is a position interfering with a movement locus of the first member and the second position is a position not interfering with the movement locus of the first member in a state where the first opening and closing guide is pivoted when the second opening and closing guide is in the second closed position, wherein while the first opening and closing guide is pivoted from the first closed position to the first opened position in a state where the second opening and closing guide is at the second closed position, the second opening and closing guide pivots from the second closed position toward the second opened position by a force transmitted to the second opening closing guide by the first member interfering with the second member, and wherein while the first opening and closing guide is pivoted from the first opened position to the first closed position in a state where the second opening and closing guide is at the second closed position, the second member is pivoted from the first position to the second position by interference of the first member with the second member, and the first opening and closing guide is configured to pivot to the first closed position, wherein in a state where the first opening and closing guide is at the first closed position, the second member is positioned at the first position.

2. The sheet conveyance apparatus according to claim 1, further comprising:

a shaft member supported pivotably on the second opening and closing guide and configured to be engaged with the second member; and a second opening and closing guide lock mechanism configured to be switched by pivoting of the shaft member between a second opening and closing guide lock position where the second opening and closing guide is locked to the second closed position and a second opening and closing guide unlock position where the second opening and closing guide is unlocked, wherein when the first opening and closing guide is switched from the first closed position to the first opened position in a state where the first opening and closing guide is at the first closed position and the second opening and closing guide is at the second closed position, a force of movement of the first member is transmitted via the second member to the shaft member and the second opening and closing guide lock mechanism is switched from the second opening and closing guide lock position to the second opening and closing guide unlock position, by which the second opening and closing guide is configured to pivot from the second closed position to the second opened position, and wherein when the first opening and closing guide is switched from the first opened position to the first closed position in a state where the second opening and closing guide is at the second closed position and the first opening and closing guide is at the first opened position, the second member is retracted from the movement locus of the first member, and the first opening and closing guide is configured to move to the first closed position without switching the second opening and closing guide lock mechanism from the second opening and closing guide lock position to the second opening and closing guide unlock position.

3. The sheet conveyance apparatus according to claim 2, wherein the shaft member comprises an engagement portion on an outer circumference, wherein the second member comprises an engaged portion supported pivotably on the shaft member and engaged with the engagement portion with a gap, the sheet conveyance apparatus further comprising an urging member configured to urge the second member to one side in a pivoting direction about the shaft member, wherein when the first opening and closing guide is switched from the first closed position to the first opened position in a state where the first opening and closing guide is at the first closed position and the second opening and closing guide is at the second closed position, the second member is engaged with the shaft member at an engagement position on one side in the pivoting direction in a state where the engagement portion and the engaged portion are abutted against one another by an urging force of the urging member, by which the force of movement of the first member is transmitted via the second member to the shaft member, and wherein when the first opening and closing guide is switched from the first opened position to the first closed position in a state where the second opening and closing guide is at the second closed position and the first opening and closing guide is at the first opened position, the second member is configured to pivot to a retracting position on the other side in the pivoting direction against the urging force of the urging member by the gap between the engagement portion and the engaged portion, by which the second member is pivoted to the retracting position by the force of movement of the first member and the second member is retracted from the movement locus of the first member.

4. The sheet conveyance apparatus according to claim 2, further comprising a second opening and closing guide operating member connected to the shaft member and configured to switch the second opening and closing guide lock mechanism between the second opening and closing guide lock position and the second opening and closing guide unlock position according to an operation of a user.

5. The sheet conveyance apparatus according to claim 1, further comprising:

a first opening and closing guide lock mechanism provided on the first opening and closing guide and configured to be switched between a first opening and closing guide lock position where the first opening and closing guide is locked to the first closed position and a first opening and closing guide unlock position where the first opening and closing guide is unlocked; and a first opening and closing guide operating member connected to the first opening and closing guide lock mechanism and configured to switch the first opening and closing guide lock mechanism between the first opening and closing guide lock position and the first opening and closing guide unlock position according to an operation of a user.

6. The sheet conveyance apparatus according to claim 1, wherein the first opening and closing guide comprises a first conveyance guide surface configured to form the first conveyance path, and wherein the second opening and closing guide is configured to form the second conveyance path downstream of the first conveyance guide surface in the sheet conveyance direction.

7. The sheet conveyance apparatus according to claim 1, wherein the first opening and closing guide and the second opening and closing guide are arranged side by side and the second opening and closing guide is arranged downstream of the first opening and closing guide in the sheet conveyance direction.

8. The sheet conveyance apparatus according to claim 1, wherein the first shaft is arranged in parallel with a shaft intersecting the second shaft.

9. The sheet conveyance apparatus according to claim 1, wherein the first shaft is arranged in parallel with the second shaft.

10. The sheet conveyance apparatus according to claim 9, further comprising:

a third member provided on the second opening and closing guide; and a fourth member provided on the first opening and closing guide and arranged at a position interfering with a movement locus of the third member when the second opening and closing guide pivots in a state where the first opening and closing guide is at the first closed position, wherein while the second opening and closing guide is switched from the second closed position to the second opened position in a state where the second opening and closing guide is at the second closed position and the first opening and closing guide is at the first closed position, a force transmitted to the first opening closing guide by interference of the fourth member with the second member pivots the first opening and closing guide from the first closed position toward the first opened position, and wherein while the second opening and closing guide is pivoted from the second opened position to the second closed position in a state where the first opening and closing guide is at the first closed position and the second opening and closing guide is at the second opened position, the fourth member retracts from the movement locus of the third member by interference of the fourth member with the second member, and the second opening and closing guide is configured to move to the second closed position.

11. An image forming apparatus comprising:

an image forming unit configured to form an image on a sheet; and the sheet conveyance apparatus according to claim 1.

* * * * *